Patented Dec. 4, 1951

2,577,381

UNITED STATES PATENT OFFICE 2,577,381

PRODUCTION OF SHAPED ARTICLES

Ernst Stirnemann, Basel, Switzerland

No Drawing. Application July 25, 1949, Serial No. 106,747. In Switzerland August 9, 1948

5 Claims. (Cl. 260—2.5)

This invention relates to improvements in or relating to the production of shaped articles.

It has been found that by working up polyvinyl chloride with mono-isocyanates shaped bodies can be produced which have improved properties as regards softening point, hardness and gas-impermeability compared to bodies produced from polyvinyl chloride or from polyvinyl chloride mixtures with the usual solvents, such as tricresylphosphate, dibutylphthalate and the like.

It has been observed as a particular feature of the bodies produced from mixtures of polyvinyl chloride with mono-isocyanates that their properties may be improved in the course of a few days without further treatment if they are allowed to stand at normal room temperature. Thus, for example, shaped bodies produced from mixtures of polyvinyl chloride and mono-isocyanates on storing for some time exhibit greater hardness and higher softening points than bodies produced from polyvinyl chloride alone under the same conditions. Moreover, structures produced from polyvinyl chloride, mono-isocyanates and softeners have a higher softening point and a better gas-impermeability than polyvinyl mixtures which do not contain mono-isocyanates.

On the other hand, mixtures of polyvinyl chloride with di- or poly-isocyanates behave differently and do not give self-hardening mixtures but must be improved by the action of water, alcohols, amines and other substances. The properties of the present mono-isocyanate mixtures can, however, be improved by the action of additional substances, for example by suitable gases, such as ammonia. Such additional measures, however, will only be used in special cases since, as already stated, the properties can be improved greatly by bringing the two substances together and allowing them to age.

The present invention accordingly provides a process for the production of shaped articles, such as shaped bodies, plates, profile pieces, cellular bodies and the like, from polyvinyl chloride, wherein for the production of structures having improved properties as regards softening point, hardness and gas-impermeability compared to structures produced from polyvinyl chloride or from mixtures of polyvinyl chloride with the usual softeners, polyvinyl chloride is thoroughly mixed with mono-isocyanates and worked up into shaped articles, if desired with application of temperature and pressure, whereby the mono-isocyanates can act initially as softeners, whilst the improved properties as regards hardness and softening point are obtained by allowing the shaped articles to age.

Co-polymers of polyvinyl chloride can also be used instead of polyvinyl chloride itself. Mono-isocyanates which may be employed include both alkyl and also aryl isocyanates, such, for example, as phenylisocyanate. If it is desired to produce flexible or elastic structures, appropriate quantities of softeners may be added to the mixtures of polyvinyl chloride and mono-isocyanates. Various additions, such as fillers, dye-stuffs and the like can also be admixed with the mass.

The present invention is of great importance for example for the production of cellular bodies, especially cellular bodies with closed cells. A high gas-impermeability of the polyvinyl chloride is of great importance in the production of cellular bodies with closed cells. As is known the cellular bodies are produced by use of gas-liberating expansion agents. If the gases developed can diffuse out through the cell walls the expansion effect of the gas developed is, of course, diminished. The expansion, therefore, depends upon the gas-impermeability of the cell walls which are very thin and may have a wall thickness of only $\frac{1}{1000}$ millimeter. The gas-impermeability of the cell walls must, therefore, meet very high requirements, as has been found, on expansion, particularly as this takes place in the heat. At the same time the mass must be sufficiently yielding and elastic in the heat to withstand inflation without rupture of the cells.

The gas-impermeability of polyvinyl chloride can be made by addition of softeners. If, however, it is desired to obtain hard or rigid bodies, the usual softeners are unsuitable.

Mixtures of polyvinyl chloride with mono-isocyanates are particularly suitable for the production of cellular bodies. As already stated above, mono-isocyanates not only have good powers of improving, i. e. of increasing the softening point and the hardness of polyvinyl chloride, but they also make the polyvinyl chloride masses yieldable and elastic in the heat and at the same time increase the gas-impermeability of the cells formed or of the cellular bodies formed. These properties become noticeable as soon as the cellular bodies are produced. Because of the increased gas-impermeability the gases developed by the expansion agents cannot escape or can only escape to a much diminished degree and thereby increase the volume of the cells. Consequently when employing the same proportion of expansion agent it is possible by using mono-isocyanates to produce cellular bodies from polyvinyl chloride with a specific weight considerably less than 0.05, for example 0.03. Since the mono-isocyanates have the property already mentioned of exerting a hardening action on polyvinyl chloride when combined therewith, it is sufficient simply to allow freshly prepared cellular bodies to stand by themselves for some days in order to cause them to harden. Products are obtained which have a much greater hardness than products produced with polyvinyl chloride alone. Having regard to the known reactions of di- and poly-isocyanates with alcohols or amines, such effects were not to be expected. It was thus surprising that mono-isocyanates should exert such a favourable action on polyvinyl chloride.

For the production of less hard but more elastic products with a raised softening point, certain quantities of the usual softeners can be added to the mixture of polyvinyl chloride and mono-isocyanates. By suitable choice of the proportions of the mixture the properties of the products can be varied within wide limits.

The following examples show how the process of the invention may be carried into effect:

(1) 80 parts of polyvinyl chloride were intimately mixed with 20 parts of phenylisocyanate at ordinary temperature and worked up on heated rollers. A mass is obtained which can be worked up into shaped bodies of the most varied kind in the usual way by pressing, injecting and the like. The structures thus formed are stored for some time and products are obtained which are distinguished by a higher softening point and a greater hardness compared to structures obtained from the usual polyvinyl chloride masses.

(2) 60 parts of polyvinyl chloride, 40 parts of softener and 20 parts of phenylisocyanate are mixed in known manner and gelled. A mass is obtained which is distinguished by its high gas-impermeability and raised softening point compared to those of a conventional mixture of polyvinyl chloride with softeners. It can be worked up in known manner to the most varied articles.

(3) 60 parts of polyvinyl chloride, 40 parts of phenylisocyanate and 25 parts of azo-isobutyric-acid-dinitrile were ground into a paste and allowed to stand for some hours. The mass was then brought into a mould and the mould was closed tightly under a hydraulic press. The closed mould was then heated for about 15 minutes to 170° C. and thereafter cooled to about 75° C. On opening the cooled mould the mass expanded to a cellular body with a specific weight of about 0.030. On standing, the cellular body hardened in the course of a few days to give a structure with great hardness and a higher softening point than that of a cellular body produced from pure polyvinyl-chloride.

I claim:

1. A process for the production of shaped articles of polyvinyl chloride plastic having improved gas impermeability and softening point which comprises thoroughly mixing a plastic composition containing polyvinyl chloride with a mono-isocyanate of the formula R-N:C:O, wherein R is a radical selected from the group consisting of alkyl and aryl radicals, working up this mixture into shaped articles and allowing the shaped articles to age to improve the hardness and softening point thereof.

2. A process in accordance with claim 1, in which the mono-isocyanate is phenyl-isocyanate.

3. A process for the production of a cellular body of low specific gravity which comprises thoroughly mixing polyvinyl chloride, an expansion agent and a mono-isocyanate of the formula R-N:C:O, wherein R is a radical selected from the group consisting of alkyl and aryl radicals, heating this mixture in a closed mould until the expansion agent decomposes while preventing expansion, allowing the resulting mass to cool and subsequently expand and thereafter allowing the resulting cellular body to age.

4. A process according to claim 3, in which the mono-isocyanate is phenyl-isocyanate.

5. A cellular body produced in accordance with the process of claim 4.

ERNST STIRNEMANN.

REFERENCES CITED

The following references are of record in the file of this patent:

UNITED STATES PATENTS

| Number | Name | Date |
|---|---|---|
| 2,333,914 | Berchet | Nov. 9, 1943 |
| 2,466,404 | Fowler et al. | Apr. 5, 1949 |